(12) United States Patent
Mikoshiba et al.

(10) Patent No.: US 9,685,038 B2
(45) Date of Patent: Jun. 20, 2017

(54) GAME SYSTEM, AND CONTROL METHOD AND STORAGE MEDIUM EMPLOYED THEREIN

(71) Applicant: Konami Digital Entertainment Co., Ltd., Minato-ku, Tokyo (JP)

(72) Inventors: Eiri Mikoshiba, Minato-ku (JP); Yosuke Ota, Minato-ku (JP); Takashi Matsui, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 343 days.

(21) Appl. No.: 14/086,239

(22) Filed: Nov. 21, 2013

(65) Prior Publication Data
US 2014/0155140 A1   Jun. 5, 2014

(30) Foreign Application Priority Data

Nov. 30, 2012   (JP) .................................. 2012-263384

(51) Int. Cl.
| | | |
|---|---|---|
| G07F 17/32 | (2006.01) | |
| A63F 13/493 | (2014.01) | |
| A63F 13/55 | (2014.01) | |
| A63F 13/79 | (2014.01) | |
| A63F 13/825 | (2014.01) | |
| A63F 13/847 | (2014.01) | |

(52) U.S. Cl.
CPC ........ *G07F 17/3251* (2013.01); *A63F 13/493* (2014.09); *A63F 13/55* (2014.09); *A63F 13/79* (2014.09); *A63F 13/825* (2014.09); *A63F 13/847* (2014.09); *A63F 2300/207* (2013.01)

(58) Field of Classification Search
None
See application file for complete search history.

(56) References Cited

U.S. PATENT DOCUMENTS

| | | | | |
|---|---|---|---|---|
| 6,468,162 | B1 * | 10/2002 | Nakamura | ............. A63F 13/10 463/23 |
| 2002/0028710 | A1 * | 3/2002 | Ishihara | .................. A63F 13/02 463/44 |
| 2003/0171142 | A1 | 9/2003 | Kaji et al. | |
| 2007/0275782 | A1 | 11/2007 | Kaji et al. | |
| 2008/0085749 | A1 | 4/2008 | Kaji et al. | |
| 2008/0132305 | A1 | 6/2008 | Kaji et al. | |

(Continued)

FOREIGN PATENT DOCUMENTS

| | | |
|---|---|---|
| JP | 2004357897 A | 12/2004 |
| JP | 2009136556 A | 6/2009 |
| JP | 2012045176 A | 3/2012 |

*Primary Examiner* — Kang Hu
*Assistant Examiner* — Robert T Clarke, Jr.
(74) *Attorney, Agent, or Firm* — Howard & Howard Attorneys PLLC

(57) ABSTRACT

Provided is a game system that is capable of limiting the usage of predetermined information individually. The game system acquires a two dimensional code for recreating a combined image from a character card, and utilizes, for the progression of a game, the combined image recreated during the game on the basis of the two dimensional code that has been acquired. And, the game system provides a two dimensional code so that information of a player name ID that is employed in order to limit the usage of the two dimensional code is included.

11 Claims, 9 Drawing Sheets

(56) References Cited

U.S. PATENT DOCUMENTS

2008/0167122 A1* 7/2008 Maeda ................ A63F 13/12
 463/30
2009/0209351 A1* 8/2009 Umaki ................ A63F 13/00
 463/42

* cited by examiner

GAME SYSTEM, AND CONTROL METHOD AND STORAGE MEDIUM EMPLOYED THEREIN

CROSS-REFERENCE TO RELATED APPLICATION

This application claims priority to Japanese Patent Application No. 2012-263384, filed Nov. 30, 2012, the disclosure of which is hereby incorporated by reference in its entirety.

TECHNICAL FIELD

The present invention relates to a game system etc. that acquires predetermined information for recreating a predetermined image from a recording medium; that utilizes, for the progression of a game, the predetermined image recreated during the game on the basis of the predetermined information that has been acquired.

BACKGROUND ART

There is a gaming machine that acquires predetermined information recorded upon a recording medium, and that employs that information in a game. As this type of gaming machine, there is known a gaming machine with which a character card is employed as a recording medium, and with which a character that has been printed upon such the character card is recreated during a game on the basis of character information included in a bar code upon the character card (for example, refer to Patent Document #1).

Patent Document #1: Japanese Laid-Open Patent Publication 2002-301264.

SUMMARY OF THE INVENTION

Technical Problem

With a prior art gaming machine such as the one described in Patent Document #1, cards of a plurality of types upon which predetermined images have been printed in advance are employed as character cards. Moreover, after the game, in some cases such cards are given as privileges. In this case, a card that is obtained after the game may be any card among a plurality of types that have been printed in advance. Even if there are differences between the types of cards, only uniform information is printed in advance on each of them. Due to this, information characteristic of the player such as information about the owner and his game results and so on, is not reflected in the information that is printed upon the cards. Accordingly individual management of the cards, such as limiting usage to a particular individual and so on, is difficult.

Accordingly, the object of the present invention is to provide a game system etc. that is capable of limiting the usage of predetermined information individually.

Means for Solution

The game system of the present invention is a game system that acquires predetermined information (AC) for recreating a predetermined image (CI) from a recording medium (KC); that utilizes, for progression of a game, the predetermined image recreated during the game on the basis of the predetermined information that has been acquired; and wherein the game system comprises an information provision device (30) adapted and configured to provide the predetermined information so that limiting information that is employed in order to limit the usage of the predetermined information is included.

According to the present invention, the predetermined information that is employed for recreating the predetermined image is provided so as to include limiting information. Due to this, it is possible to limit individually the usage of the predetermined information that was recorded upon the recording medium, on the basis of the limiting information included in the predetermined information.

And, according to one aspect of the present invention, information characteristic of each player of the game may be employed as this limiting information, and the information provision device may provide the predetermined information so that the characteristic information is included as the limiting information. In this case it is possible to limit individually the usage of the predetermined information, on the basis of the information characteristic of the player. Incidentally, for example, information relating to the game such as the results of games by the player and information for specifying the player may be included in the information characteristic of the player. And, for example, information about the name of the player or establishing a correspondence therewith may be included in the information for specifying the player.

Information of various types may be employed as the information characteristic of the player. For example, as one aspect according to the present invention of using the information characteristic of the player, player specific information for specifying each player may be employed as the characteristic information. Moreover, in this aspect, there may be additionally provided a group data storage device (11) that stores group data (22) for grouping together a predetermined number of players into one group on the basis of the player specification information, and, on the basis of the group data, the usage of the predetermined information may be limited based upon the group to which the player specification information included in the predetermined information belongs. In this case, it is possible to manage limitation of usage of the predetermined information on the basis of the groups.

And, as one aspect in which the groups are used as a basis for limitation, there may be employed a aspect further comprising: an awarding condition determination device (10) adapted and configured to, on the basis of the group data, and based upon the groups, determine whether or not a privilege awarding condition is satisfied in units of groups; and a privilege awarding device (10) adapted and configured to, on the basis of the results of determination by the awarding condition determination device, award an advantageous development to all the players who belong to a group that satisfies the privilege awarding condition. In this case, the basis for managing limitation is employed as a unit for awarding privileges which means advantageous developments. Accordingly, it is possible to establish a correspondence between the basis for limitation and the units for awarding privilege. Due to this, for example, if the usage of predetermined information by a player who is not a member of the same group is limited, then it is possible to manage the subjects for determining whether or not the privilege awarding condition is satisfied on the basis of the limiting information.

Conditions of various types may be employed as the privilege awarding condition. For example, in the aspect in which an advantageous development is awarded on the basis of a privilege awarding condition, as the game, a game in which items are awarded during play may be employed; and, as the privilege awarding condition, a condition that is satisfied if the total number of specified items awarded to the players within the group is at least a predetermined number may be employed.

As one aspect of the game system of the present invention, there may be employed a aspect further comprising: a possible/impossible determination device (10) adapted and configured to, when the limiting information is acquired from the recording medium, determine whether or not the predetermined information can be used on the basis of the limiting information; and a possible/impossible control device (10) adapted and configured to control whether or not the predetermined information is used on the basis of the result of determination by the possible/impossible determination device. In this case, it is possible reliably to limit the usage of the predetermined information on the basis of the limiting information.

And, as one aspect of the present invention, it is also possible to employ a game system that further comprises a format storage device (31) that stores format data (35) for expressing a base format (FI) corresponding to a fixed portion of the predetermined image, so that a variable region which is capable of changing information to be displayed in the predetermined image is included in the base format, wherein: the information provision device provides the predetermined information so that game information relating to the result of the game is further included therein; and a combined image (CI) in which the base format and the game information are combined so that the game information is displayed in the variable region is used as the predetermined image. In this case, it is possible further to provide a game in which the combined image that reflects the result of the game is utilized during the progression of the game.

And, as one aspect of utilizing the combined image of the present invention, it would also be possible to employ a game system that further comprises an image data generation device adapted and configured to generate image data for expressing the combined image, in which at least one of the image data and the combined image is recorded upon the recording medium. In this case, it is possible to determine an image that is to be recreated during the game from the image data or the combined image.

The predetermined information may be recorded on the recording medium in any manner. For example, in one aspect of the game system of the present invention, at least one of a two dimensional code (AC) created in conformity to a predetermined standard so as to include the predetermined information, and code data for expressing the two dimensional code, may be recorded upon the recording medium. Moreover, as one aspect of this type, it would also be possible to employ an aspect further comprising: a printer (32) that can print the two dimensional code and the predetermined image; and a code reader (7) that can read the two dimensional code printed upon the recording medium; and wherein the printer prints the two dimensional code and the predetermined image upon the recording medium on the basis of the predetermined information and the code data.

The game may be provided in any appropriate manner. For example, as one aspect of the game system of the present invention, a server apparatus (2) may be provided to which a user terminal that provides the game is connected via a communication line (3), and this server apparatus may provide at least one of an application (23) and data (24) for the user terminal for providing the game to the user terminal via the communication line.

A control method for controlling a computer of the present invention is applied to a game system (1) that acquires predetermined information (AC) for recreating a predetermined image (CI) from a recording medium (KC) and that utilizes, for progression of a game, the predetermined image recreated during the game on the basis of the predetermined information that has been acquired, and wherein the control method for controlling a computer comprises an information provision step that provides the predetermined information so that limiting information that is employed in order to limit the usage of the predetermined information is included.

A non-transitory computer readable storage medium storing a computer program for a game system of the present invention stores a computer program for a game system that acquires predetermined information for recreating a predetermined image from a recording medium; that utilizes, for progression of a game, the predetermined image recreated during the game on the basis of the predetermined information that has been acquired; and wherein the computer program for the game system is configured so as to cause a computer which is incorporated into the game system, to function as an information provision device adapted and configured to provide the predetermined information so that limiting information that is employed in order to limit the usage of the predetermined information is included. It is possible to actualize a game system of the present invention by executing the storage medium or the control method of the present invention.

Incidentally, while reference symbols in the appended drawings are included in parentheses in the above explanation in order to make the present invention simpler to understand, the present invention is not to be considered, due to the use of these reference symbols, as being limited in any way to the embodiment thereof that is disclosed.

Advantageous Effects of the Invention

As described above, according to the present invention, it is possible to provide a game system etc. that is capable of limiting the usage of predetermined information individually.

DESCRIPTION OF THE EMBODIMENTS

Figure 1:
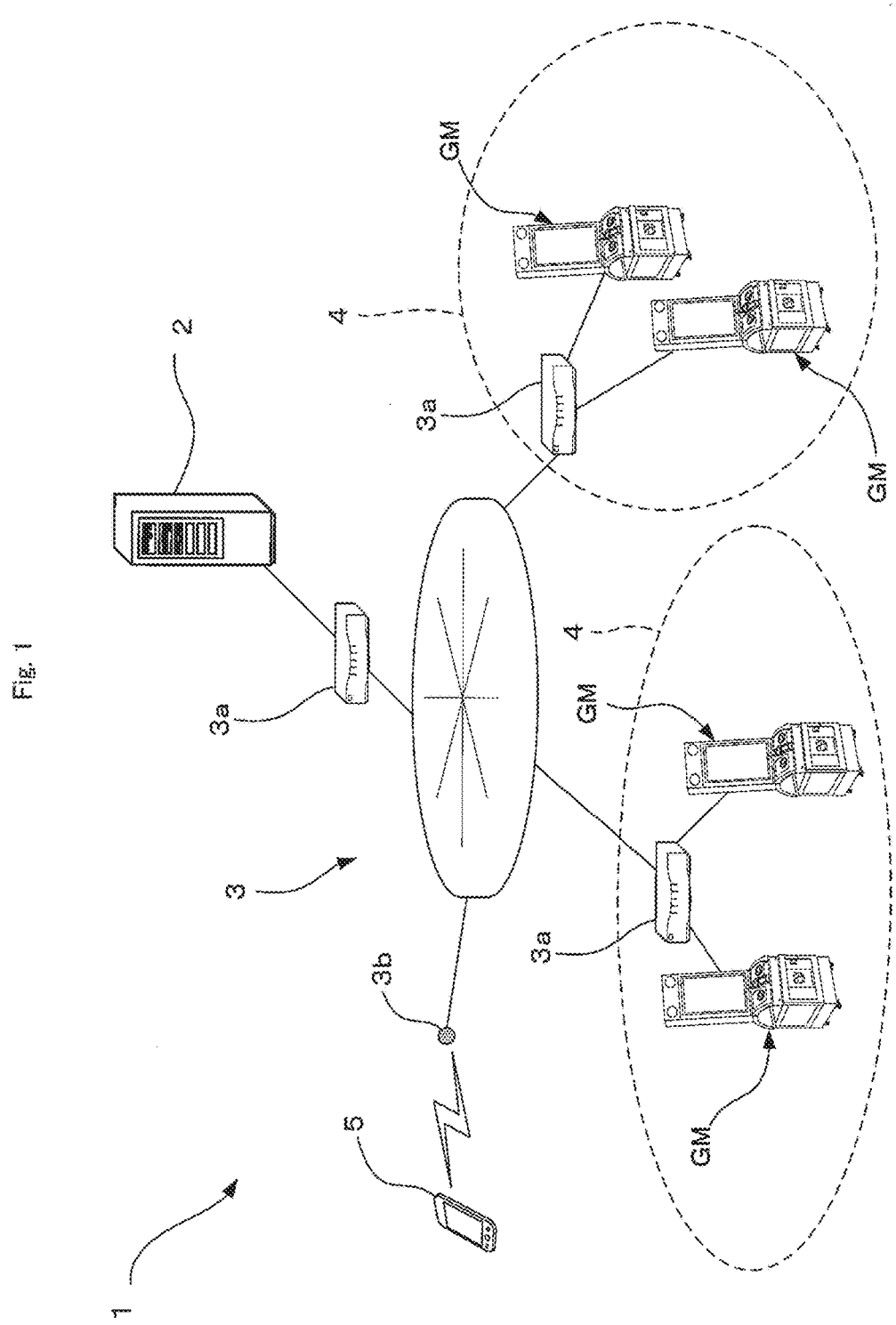
FIG. 1 is a figure showing a summary of the overall structure of a game system according to an embodiment of the present invention.

A game system according to an embodiment of the present invention will now be described below. FIG. 1 is a figure showing a summary of the overall structure of a game system according to an embodiment of the present invention. As shown in FIG. 1, the game system 1 includes a center server 2 serving as a server apparatus, and gaming machines GM. The gaming machines GM are connected to the center server 2 via a network 3 serving as a communication line. The gaming machines GM are gaming machines for business use (i.e. for commercial use) each of which, in exchange for expenditure of a predetermined consideration, enables the user to play a game over a range corresponding to that consideration. As one example, each of the gaming machines GM may provide a card game in exchange for expenditure of a predetermined consideration. An appropriate number of these gaming machines GM are installed in each of several commercial establishments such as stores 4 or the like. Moreover, user terminals 5 are connected to the center server 2 via the network 3. The center server 2 is not limited to the one shown in this example which consists of a single physical apparatus. For example, it would also be acceptable for a single logical center server 2 to be built as a server group that consists of a plurality of physical apparatuses. Moreover, it would also be acceptable for the center server 2 to be constituted logically using cloud computing. Yet further, it would also be acceptable to arrange for one of the gaming machines GM to function as the center server 2.

The user terminals 5 are a type of network terminal device, and serve functions of various types by executing software distributed from the center server 2. In the example shown in FIG. 1, as one kind of the user terminals 5, portable telephones (including smart phones) may be employed. Moreover, network terminal devices of various types that can be connected to the network and that moreover are compatible with individual use may be employed as the user terminals 5, such as, for example, personal computers, portable type game machines, and portable type tablet terminal devices, among others. Furthermore, in this specification, when a user is playing a game via a gaming machine GM, this user will sometimes be specifically referred to as the player.

The network 3 may be built to implement network communication by, for example, employing the TCP/IP protocol. Typically, the network 3 will be configured by a combination of the internet as a WAN and intranets as one or more LANs. In the example of FIG. 1, the center server 2 and the gaming machines GM are connected to the network 3 via routers 3a, while the user terminal 5 is connected to the network 3 via an access point 3b.

The center server 2 provides gaming machine services of various types to the gaming machines GM, or to their players. As the gaming machine service, for example, there may be provided a service of receiving player identification information from a gaming machine GM, and authenticating that player. Moreover, such a service may be provision of the service of receiving play data for an authenticated player from a gaming machine GM and storing that play data, or provision of the service of supplying stored play data to a gaming machine GM. Furthermore, a service of distributing and/or updating programs or data to the gaming machines GM via the network 3, a matching service of performing matching between users when a plurality of users are playing a common game with one another via the network 3, and so on may be included in these gaming machine services.

Furthermore, via the network 3, the center server 2 provides web services of various types to the users of the user terminals 5. These web services may, for example, include a game information service of supplying information of various types related to the games supplied by the gaming machines GM (in the following, sometimes these are termed "arcade games"). Furthermore, these web services also include a distribution service of distributing data and applications of various types to the user terminals 5 (including updating data and so on). Moreover, apart from the above, these web services also include a community service of supplying a so called common forum for information sending, exchange, and sharing by users, a service of allocating user IDs for identifying users, and so on.

Figure 2:
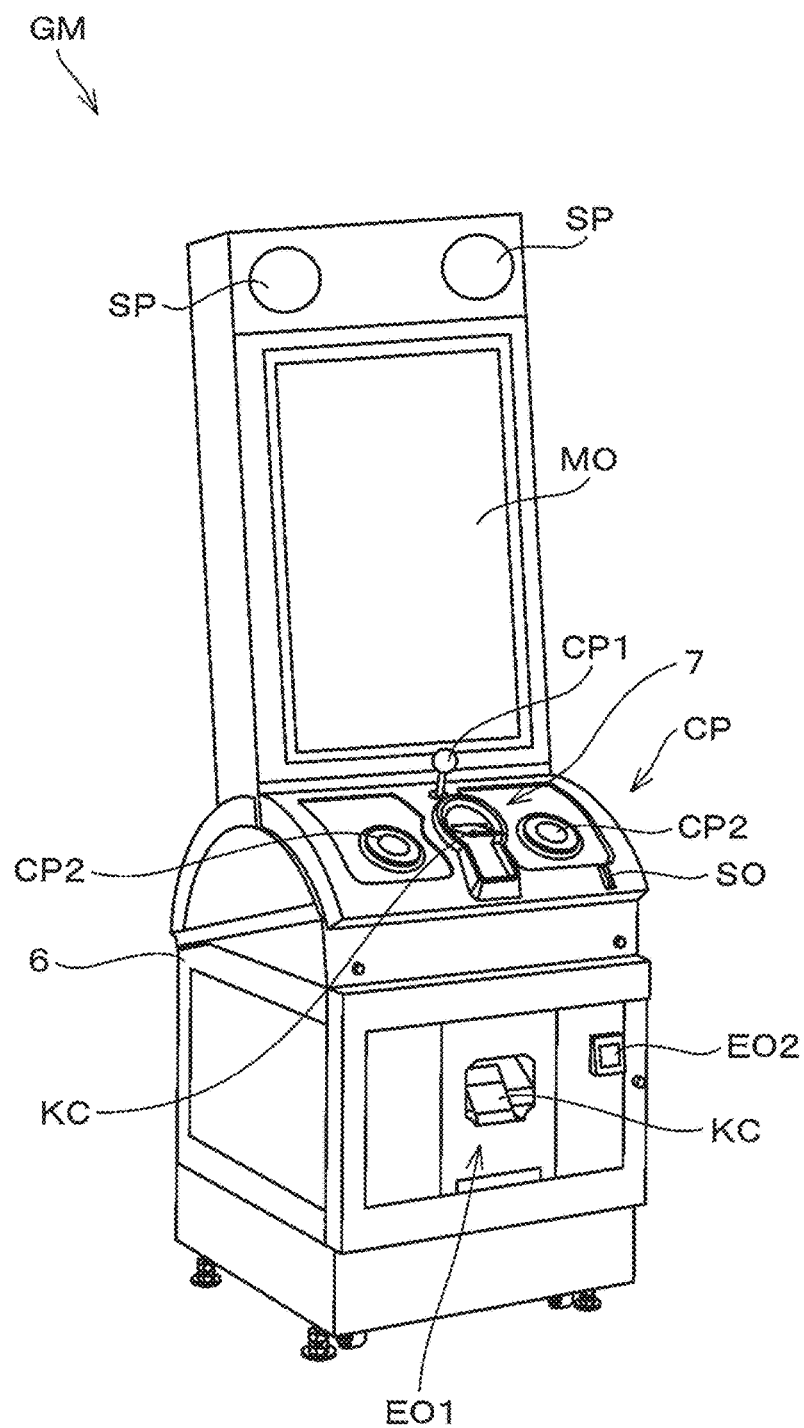
FIG. 2 is a figure schematically showing the external appearance of a gaming machine according to an embodiment of the present invention.

Referring to FIG. 2, the gaming machines GM will now be further described. FIG. 2 is a figure schematically showing the external appearance of a gaming machine according to an embodiment of the present invention. As shown in FIG. 2, the gaming machine GM comprises a casing 6. A control panel CP, a monitor MO, and speakers SP are provided at the upper portion of the casing 6. The monitor MO is disposed over the control panel CP. Moreover, the speakers SP are disposed even higher, over the monitor MO. Incidentally, apart from the control panel CP, input and output devices of various types such as are typically provided to a gaming machine for commercial use, for example a volume control knob, a power supply switch, a power on light, and so on, are also provided to the gaming machine GM, but these elements are omitted from FIG. 2.

A direction selection actuation unit CP1 with which a direction can be selected, buttons CP2 that can be used for confirmation and so on, a code reader 7, and a coin input slot SO are provided upon the control panel CP. The code reader 7 is configured to be capable of reading a two dimensional code and of outputting a signal according to the result of this reading. A character card KC serving as a recording medium upon which a two dimensional code is printed, is inserted into the code reader 7. Moreover, a card delivery outlet EO1 and a coin delivery outlet EO2 are provided upon the front surface of the casing 6. The card delivery outlet EO1 is used for ejecting a character card KC that has been printed in the interior of the casing 6. Incidentally, actuation units of various types such as buttons that can be employed for performing various other operations and so on are provided upon the control panel CP, but these are not shown in the drawings.

Figure 3:
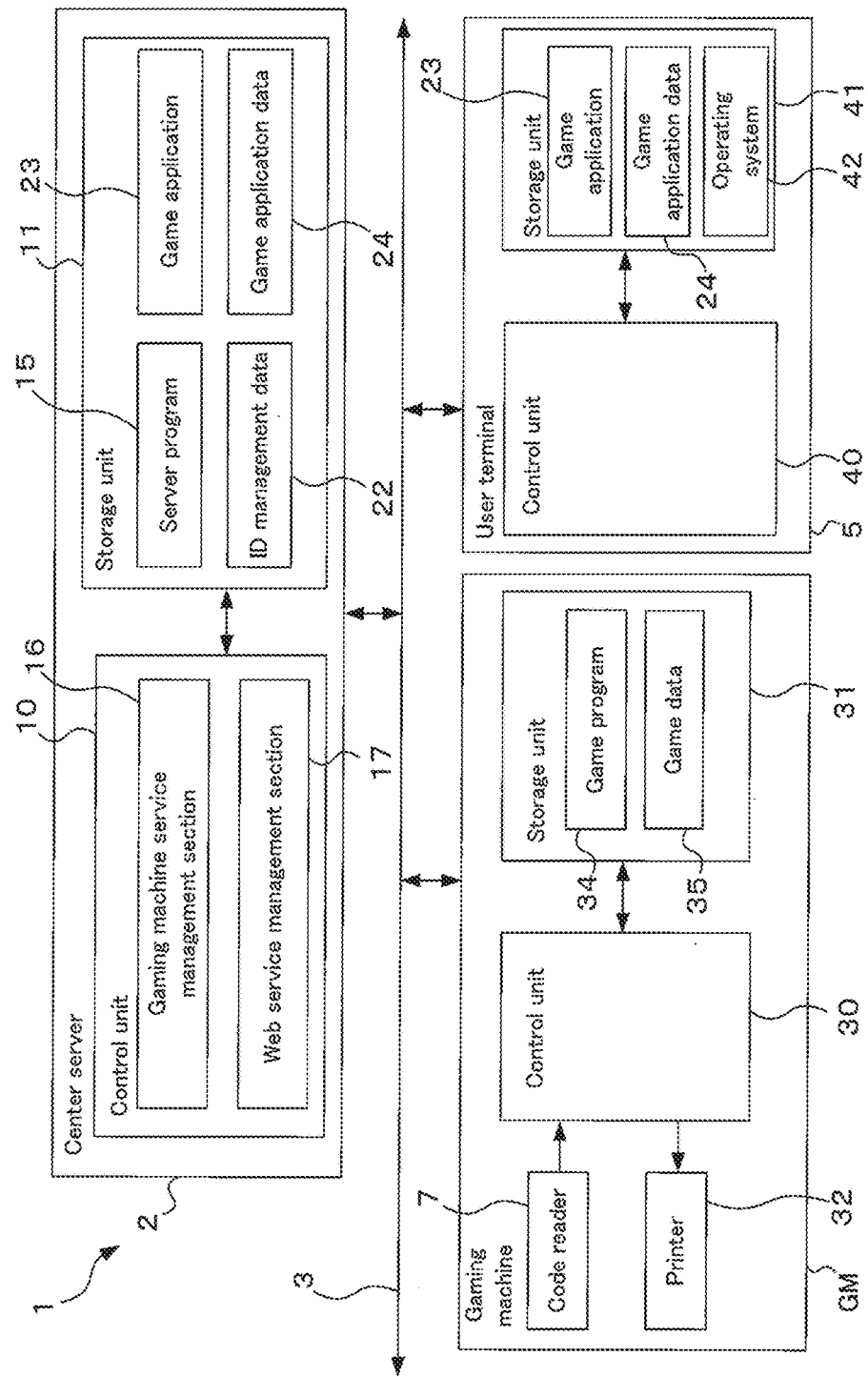
FIG. 3 is a figure showing the structure of principal portions of the game system of FIG. 1.

Referring to FIG. 3, the game system 1 will now be further described. FIG. 3 is a figure showing the structure of principal portions of the game system of FIG. 1. As shown in FIG. 3, the center server 2 comprises a control unit 10 and a storage unit 11. The control unit 10 is configured as a computer unit in which a microprocessor is combined with peripheral devices of various types such as internal storage devices (for example, ROM and RAM) and so on that are required for the operation of that microprocessor. Incidentally, while input devices such as a keyboard and so on and output devices such as a monitor and so on can be connected to the control unit 10, these are not shown in the drawings.

The storage unit 11 is connected to the control unit 10. This storage unit 11 is configured with, for example, a high capacity storage medium such as magnetic tape or the like, so as to be capable of maintaining stored data even if no supply of power is provided. A server program 15 is stored in the storage unit 11. This server program 15 is a computer program that is needed for the center server 2 to provide services of various types to the gaming machines GM and to the user terminals 5. A gaming machine service management section 16 and a web service management section 17 are provided internally to the control unit 10 by the control unit 10 reading in and executing this server program 15. The gaming machine service management section 16 executes processing for providing the gaming machine services described above. On the other hand, the web service management section 17 executes programming required for providing the web services described above. The gaming machine service management section 16 and the web service management section 17 are logical devices that are actualized by combinations of computer hardware and computer programs. Incidentally, apart from these, logical devices of various other types may be provided internally to the control unit 10, but these are omitted from the drawings.

Furthermore, data of various types is stored in the storage unit 11, and this data can be referred to with execution of the server program 15. For example, ID management data 22 is included as one of these various types of data. This ID management data 22 is data in which correspondence relationships are specified between IDs of various types that are used by the game system 1. For example, a correspondence between user IDs and information for specifying various types of users is specified in the ID management data 22. The details of the ID management data will be described hereinafter.

Yet further, applications of various types and application data for applications of various types are also stored in the storage unit 11. The applications of various types are software that is distributed to a user terminal 5 as one of web services. Moreover, such application data is data of various types for reference during execution of the applications. For example, a game application 23 is included in these applications. Furthermore, game application data 24 is included as application data for the game application 23. By executing the game application 23, the user terminal 5 provides a game (subsequently sometimes referred to as the "mobile game") corresponding to the game application 23 while referring to the game application data 24. As one example, the game application 23 may be configured so as to supply a card game. Incidentally, while in the example of FIG. 2 only one game application 23 and one set of game application data 24 are shown, actually a plurality of game applications and a plurality of sets of application data may be provided in order to support games of various types.

A control unit 30 serving as a computer, a storage unit 31, the code reader 7 described above, and a printer 32 is provided to the gaming machine GM. The storage unit 31, the code reader 7, and the printer 32 are all connected to the control unit 30. The control unit 30 is built as a computer unit in which a microprocessor is combined with peripheral devices of various types such as internal storage devices (for example, ROM and RAM) and so on that are required for the operation of that microprocessor. Incidentally while, in common with a per se known gaming machine, in addition to the control panel CP, the monitor MO, and the speakers SP described above, input devices and output devices of various types such as a card reader writer and a coin authentication device and so on can also be connected to the control unit 30, these are not shown in the drawings.

The code reader 7 is a per se known device for reading two dimensional codes. This code reader 7 reads a two dimensional code printed upon a character card KC, and outputs a signal corresponding to the result of this reading to the control unit 30. The printer 32 is a per se known printing device for printing images, symbols (including two dimensional codes), and characters and so on upon a predetermined recording medium. The printer 32 creates a character card KC by printing one or more images, symbols, and/or letters upon a recording medium in card form, on the basis of an output signal from the control unit 30.

The storage unit 31 may be configured with, for example, a hard disk, a flash SSD (Solid State Drive), or the like, so as to be capable of maintaining stored data without receiving any supply of power. A game program 34 and game data 35 are stored in this storage unit 31. The game program 34 is a computer program that is needed for the gaming machine GM to supply the card game. And the game data 35 is data of various types that can be referred to during the execution of the game program 34. Image data and sound effect data may, for example, be included in the game data 35.

On the other hand, a control unit 40 and a storage unit 41 are provided to the user terminal 5. The control unit 40 is configured as a computer unit in which a microprocessor is combined with peripheral devices of various types such as internal storage devices (for example, ROM and RAM) and so on that are required for the operation of that microprocessor. Moreover, the storage unit 41 is connected to the control unit 40. The storage unit 41 may be configured with, for example, a hard disk, a flash SSD (Solid State Drive), or the like, so as to be capable of maintaining stored data without receiving any supply of power. Software executed by the control unit 40 and so on is stored in the storage unit 41. As an example of this type of software etc., an operating system 42 (hereinafter sometimes referred to as an "OS") is stored in the storage unit 41. By being executed by the control unit 40, the OS 42 provides base functions of the user terminal 5.

Furthermore, applications of various types that operate under the OS 42 and application data for applications of various types are also stored in the storage unit 51. By execution of these applications of various types operating under the OS 42, the user terminal 5 provides functions corresponding to these applications of various types. And, as one example of such applications and application data of various types, the storage unit 41 stores a game application 23 and game application data 24. The user terminal 5 provides the card game described above by the game application 23 operating under the OS 42. Moreover, for example, the game application 23 and the game application data 24 may be distributed from the center server 2 via a web service, and then may be stored in the storage unit 41.

Next, a card game that is supplied as an arcade game (sometimes referred to in the following as an "arcade card game") and a card game that is supplied as a mobile game (sometimes referred to in the following as a "mobile card game") will be described. The arcade card game is a card game of a type in which monsters are trained up during the game via battles or missions or the like. During the game, treasures of various types serving as specified items also appear, and these treasures of various types may be awarded to the player via battles or missions or the like. And a privilege is awarded to a player having the treasures that satisfy a privilege awarding condition. As a privilege, for example, permission to use a rare monster whose rarity value is high may be employed. In other words, the use of a rare monster is permitted to a player who satisfies a privilege awarding condition. Incidentally, a "rare" monster generally means a monster for which the game conditions are better than for a normal monster (i.e. a monster with which the possibility of obtaining a good game result is higher). In other words, being permitted to use a rare monster is equivalent to being awarded a possibility of advantageous development during the game.

Furthermore, in the arcade card game, a monster that has been trained up during the game may be generated as a character card KC. Various types of information for defining the monster that has been trained up are included in this character card KC that is generated. Information of this type includes attributes of the monster, its level, its attacking power, its defending power, its image, and so on. Moreover, a two dimensional code which has been encoded so as to include information for specifying this monster is also printed upon the character card KC. This two dimensional code is code that is generated in conformity with a predetermined standard, so as to include information of various types. The character card KC is generated by printing this information in variable regions of a base format. The character card KC is used during play the next time and subsequently. In concrete terms, the monster that is defined by the character card KC is recreated during the game by the code reader 7 reading in the two dimensional code on the character card KC. Accordingly, by taking advantage of the character card KC, continuous training up of the monster is possible. The two dimensional code that has been created so as to include the game result and so on functions as the "predetermined information" of the Claims.

Figure 4:
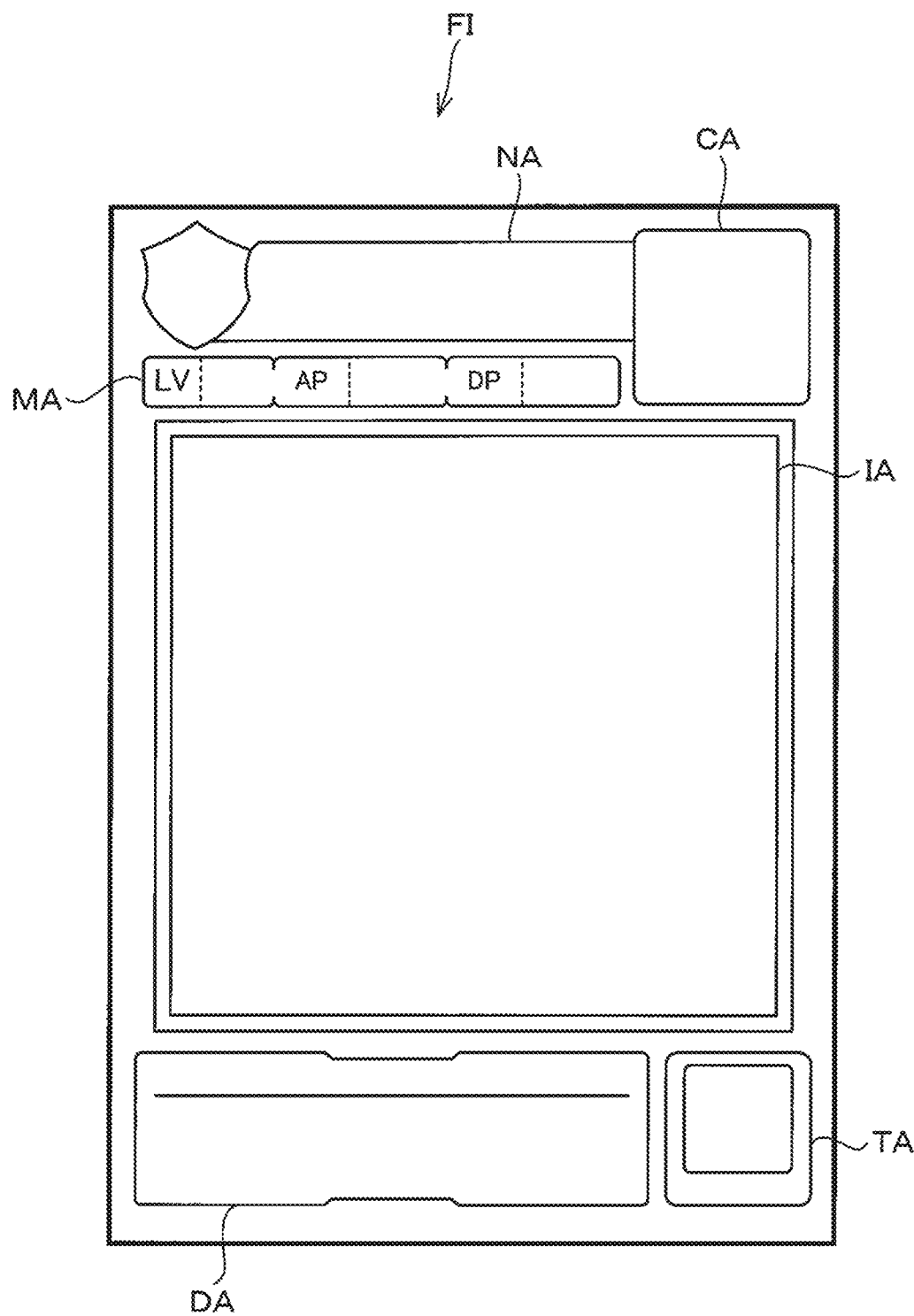
FIG. 4 is a figure schematically showing an example of an image for a base format portion.

Referring to FIG. 4, the character card KC that is generated by the gaming machine GM will now be described further. This character card KC includes a base format portion that is fixedly disposed and a variable region portion that changes according to the result of the game. As one example, the base format portion may be printed on the basis of format data included in the image data of the game data 35. FIG. 4 is a figure schematically showing an example of an image for this base format portion. As shown in FIG. 4, the image FI for the base format portion includes a name region NA, a monster information region MA, a code information region CA, an image region IA, a comments region DA, and a treasure information region TA. The result of the game is reflected in these regions NA, MA, CA, IA, DA, and TA. In other words, the information that is displayed in these regions NA, MA, CA, IA, DA, and TA changes according to the result of the game. Accordingly, the interiors of these regions NA, MA, CA, IA, DA, and TA function as variable regions. On the other hand, the positions and sizes of these regions NA, MA, CA, IA, DA, and TA do not change. Accordingly, the boundary lines that separate these regions NA, MA, CA, IA, DA, and TA from one another function as a base format. And the character card KC is generated by printing a combined image serving as a predetermined image in which the base format image has been combined with the information that is to be disposed in the variable regions, upon a card type recording medium (i.e. upon a printing medium).

The name of the monster and the name of the player who owns it are displayed in the name region NA. The level of the monster and information for defining the monster such as its attacking power and its defending power and so on are displayed in the monster information region MA. An image of the monster is displayed in the image region IA. Comments about the monster are displayed in the comments region DA. And, if any treasure has been acquired during the game, information about the treasure that has been acquired is displayed in the treasure information region TA. Accordingly, a display of treasure in the treasure information region TA also corresponds to a display of the treasure possessed by the player. A two dimensional code is displayed in the code information region CA. This two dimensional code is encoded so as to include the information included in the regions NA, MA, CA, IA, DA, and TA. Moreover, information for determining the player who owns this character card KC is also included in the two dimensional code. In other words, the character card KC is configured so as to be able to determine its owner on the basis of this information. This character card KC in which the game result is reflected in the information in these regions NA, MA, CA, IA, DA, and TA is generated by the arcade card game.

In the mobile card game, a card game that is similar to the one provided in the arcade card game is provided. However, in the mobile card game, no character cards KC are generated. In the mobile card game, instead of a character card KC, a card image is generated that corresponds to a character card KC. This card image is an image that corresponds to the combined image printed upon the character card KC. Accordingly, the information that is included in the card image is similar to the information included upon the character card KC. A code image that corresponds to a two dimensional code is also included in this information. In other words, a display of a code image is also included in the card image. Due to this, a monster that has been trained up in the mobile card game can also be used on the gaming machine GM, through the code image.

Figure 5:
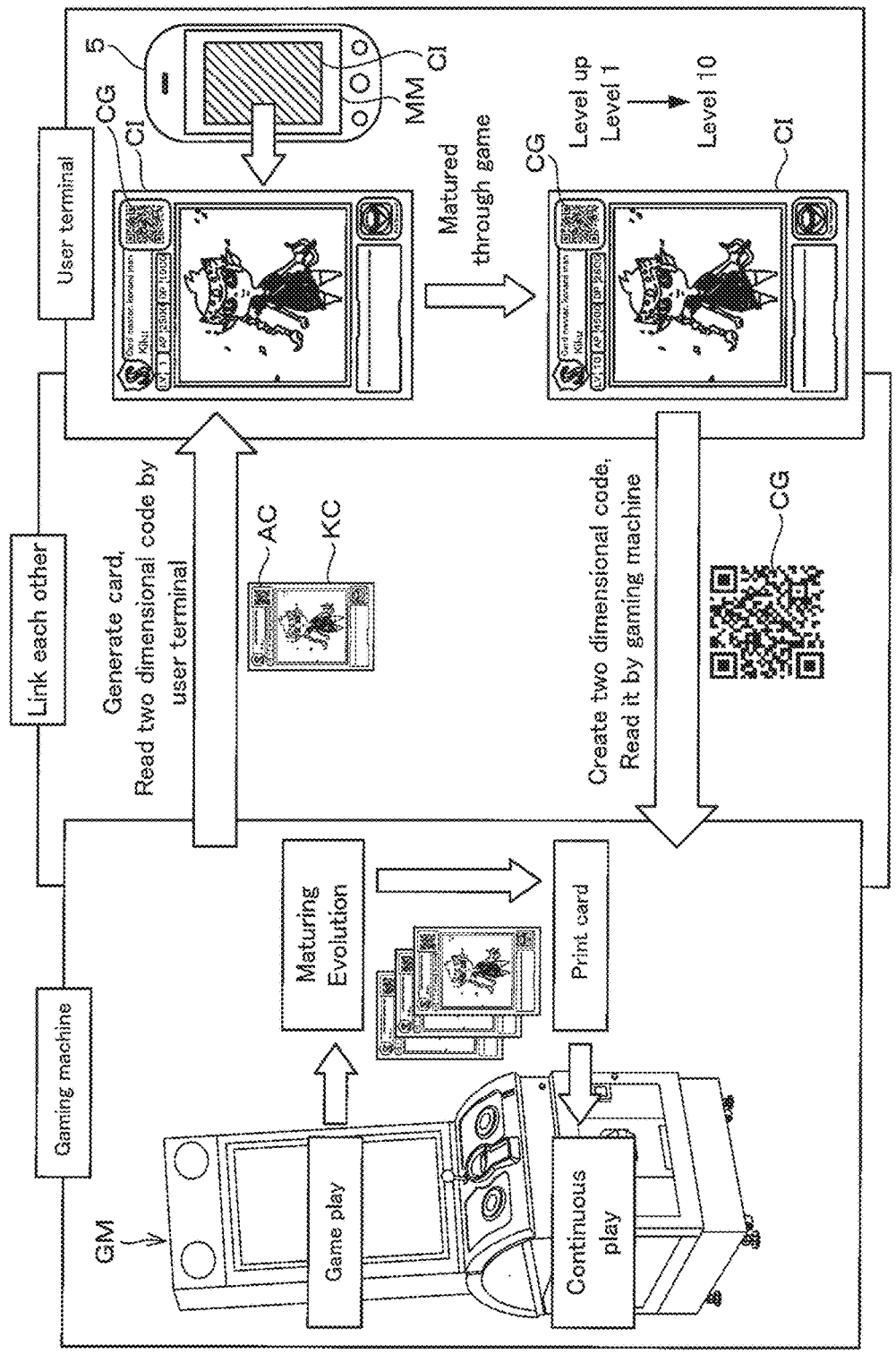
FIG. 5 is an explanatory figure for explanation of cooperative operation between an arcade card game and a mobile card game.

FIG. 5 is an explanatory figure for explanation of cooperative operation between the arcade card game and the mobile card game. As shown in FIG. 5, the arcade card game on the gaming machine GM and the mobile card game on the user terminal 5 mutually cooperate via a character card KC and a card image CI. In concrete terms, the result of the arcade card game, in other words a monster that has been trained up, is transferred to the mobile card game via the two dimensional code AC on the character card KC. Due to this, a monster that has been trained up upon the arcade card game can be further trained up upon the mobile card game. Furthermore, a monster that has been trained up upon the mobile card game can be made into a card image CI on the user terminal 5. In more concrete terms, data for displaying a card image CI is created by the user terminal 5, and a card image CI based upon this data is displayed upon a display device MM such as a monitor or the like. And, via a code image CG that is included in this card image CI, this monster that has been trained up upon the mobile card game can be further trained up upon the arcade card game. The arcade card game and the mobile card game are provided so as to cooperate mutually in this manner.

Furthermore, as described above, information for identifying the player (hereinafter sometimes termed player specification information) is included in the two dimensional code AC on the character card KC. For example, a unique ID for each name (hereinafter sometimes termed the player name ID) may be used as this player specification information. The arcade card game is supplied by the gaming machine GM while identifying each owner on the basis of the player name ID. On the other hand, in the case of the mobile game, it is supposed that it may also be participated in not only by an individual person, but also on a cooperative basis by a family, for example. Accordingly, in the mobile game, it is possible to register a predetermined number of players (i.e. a predetermined number of player name IDs) to a single user terminal 5, so that the game can be participated in by the entire family or the like on a cooperative basis. In other words, by using the user terminal 5, it is possible for a plurality of players to participate in the game and to progress the game cooperatively together.

Figure 6:
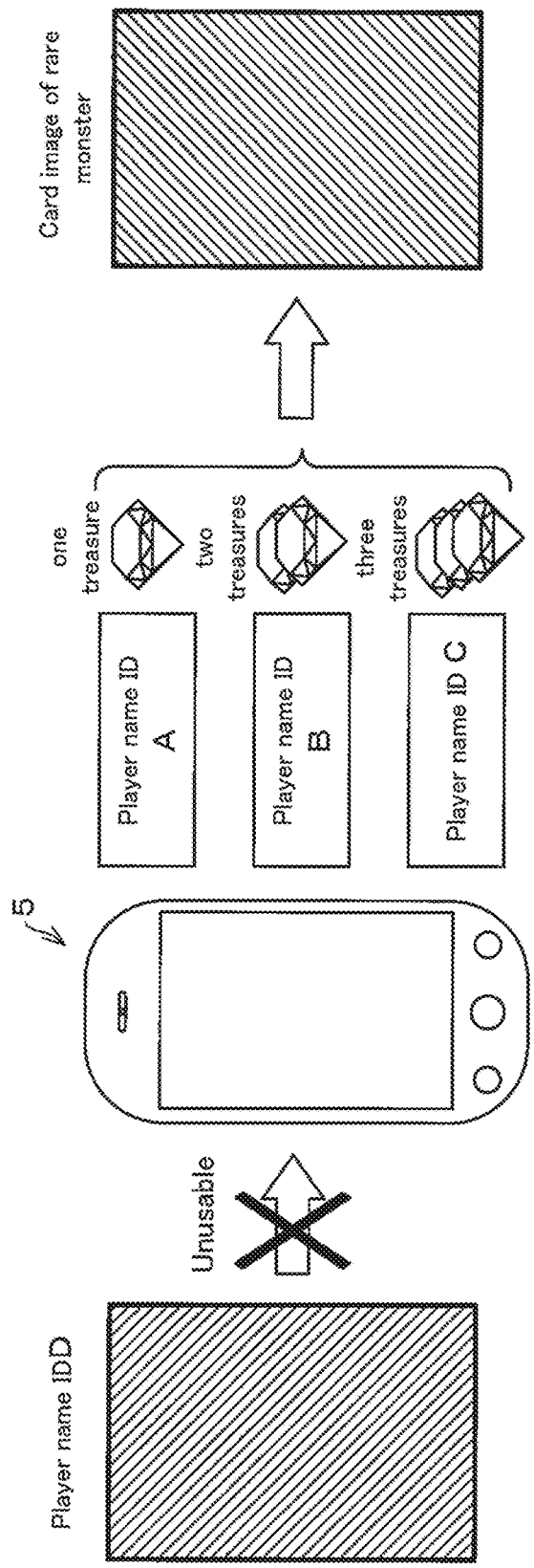
FIG. 6 is an explanatory figure for explanation of the mobile card game when a predetermined number of players are participating cooperatively together.

FIG. 6 is a figure for explanation of the mobile card game when a predetermined number of players are participating cooperatively together. The example of FIG. 6 shows a case in which this predetermined number of players is three. In this case, as shown in FIG. 6, three player name IDs are registered to a single user terminal 5 (subsequently, in some cases, the three named players who are registered to a single user terminal 5 will be termed a "cooperating group"). Furthermore, the treasures that are possessed by the players in a cooperating group are shared in common. In other words, if the total of the treasures possessed by the three players in a cooperating group satisfies the privilege awarding condition, then the usage of a rare monster is permitted to any of those three players. Moreover, if the usage of a rare monster is permitted, then that rare monster can be made into a card image CI, and can also be possessed as the card image CI. In this case, the card image CI of the rare monster can be used by all of the three people. In other words, an advantageous development can be awarded to all of the players who belong to the cooperating group by permitting the usage of a rare monster.

In the example of FIG. 6, a condition that is satisfied when the players possess six or more treasures is employed as the privilege awarding condition. And the player whose name is "A" possesses one treasure, the player whose name is "B" possesses two treasures, and the player whose name is "C" possesses three treasures. In other words, the three players currently possess a total of six treasures, so that the privilege awarding condition is satisfied. Accordingly, in this case, the usage of a rare monster is permitted to the three players. And each of the players in a cooperating group that satisfies the privilege awarding conditions is able to make this rare monster into a card image CI. Furthermore, if a rare monster has been made into a card image CI, then that rare monster can also be used in the arcade card game via this card image CI. Yet further, after it has been thus used in the arcade card game, the rare monster can also be made into a character card KC. In other words, the three players in the cooperating group not only can train up a monster together, but also can share and use the treasures and so on that they each possess. In this manner, the three players who are registered to the single user terminal 5 are able to play both the arcade card game and the mobile card game in which they participate cooperatively together.

On the other hand, in the case of a character card KC or a card image CI of a player other than the three players who are registered to the single user terminal 5, this character card KC or card image CI cannot be used in the mobile card game even if it is read. In other words, the usage of a character card KC or of a card image CI belonging to a player other than the three players who belong to the cooperating group is not permitted. The number of players who can participate cooperatively together in this manner is limited based upon the player name IDs. In more concrete terms, based upon the cooperating groups, the usage of a character card KC or a card image CI is limited according to whether or not it is a character card KC or a card image CI of a player name ID who belongs to the same cooperating group. Furthermore, by being used in this manner, the player name ID functions as the "limiting information" of the Claims.

Figure 7:
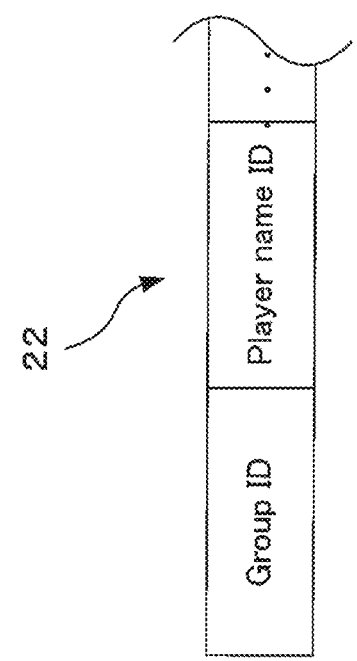
FIG. 7 is a figure showing an example of details of data of ID management data for managing players who are in a mutually cooperative participating relationship.

Next, the details of the ID management data 22 will be described. This ID management data is data for managing IDs of various types. For example, the ID management data 22 includes name ID management data for defining a correspondence relationship between the names of players and player name IDs. Moreover, the ID management data 22 also includes group ID management data for managing the players who belong to cooperating groups, in other words for managing the player name IDs that are registered to the user terminals 5. Because of this, the ID management data 22 functions as the "group data" of the Claims. FIG. 7 is a figure showing an example of details of the group ID management data of the ID management data 22, for managing the players who belong to the cooperating groups. As shown in FIG. 7, information about group IDs and player name IDs is included in the group ID management data of the ID management data 22. The group ID management data 22 is constructed as a set of records in which these types of information are described so as to establish a mutual correspondence.

Each group ID is a unique ID for identifying one of the user terminals 5. It would be possible, for example, to employ information consisting of the IP address corresponding to each user terminal 5 as its group ID. Or it would also be possible to utilize a unique ID which is associated with the IP address, or the like. And the player name ID is a unique ID for each player name. Each of the group IDs are associated with the player name IDs of the players who belong to the group that corresponds to that group ID, that is, are associated with the player name IDs that are registered to the user terminal 5 that corresponds to that group ID. In other words, the players are grouped according to the group ID management data. Moreover, the player name IDs are also used for management of the names of the players in the name ID management data.

Next, an image data generation processing and a usage possible/impossible control processing will be described. This image data generation processing is executed in order to generate image data for expressing a character card KC or a card image CI. And this usage possible/impossible control processing is executed in order to determine whether or not usage of a character card KC or of a card image CI is possible. Furthermore, it is also decided by the usage possible/impossible control processing whether or not it is possible to use a rare monster. As one example, the image data generation processing may be executed by the control unit 30 of the gaming machine GM. On the other hand, as one example, the usage possible/impossible control processing may be executed via the control unit 10 of the center server 2 via the web service management section 17. Incidentally, apart from the above, the control unit 10 of the center server 2, the control unit 30 of the gaming machine GM, and the control unit 40 of the user terminal 5 also execute per se known processing of various types, either singly or in cooperation. For example, this per se known processing may include processing for supplying the above described gaming machine services and web services, and processing of various types for supplying the arcade card game and the mobile card game, and so on. However, detailed explanation of these is omitted.

Figure 8:
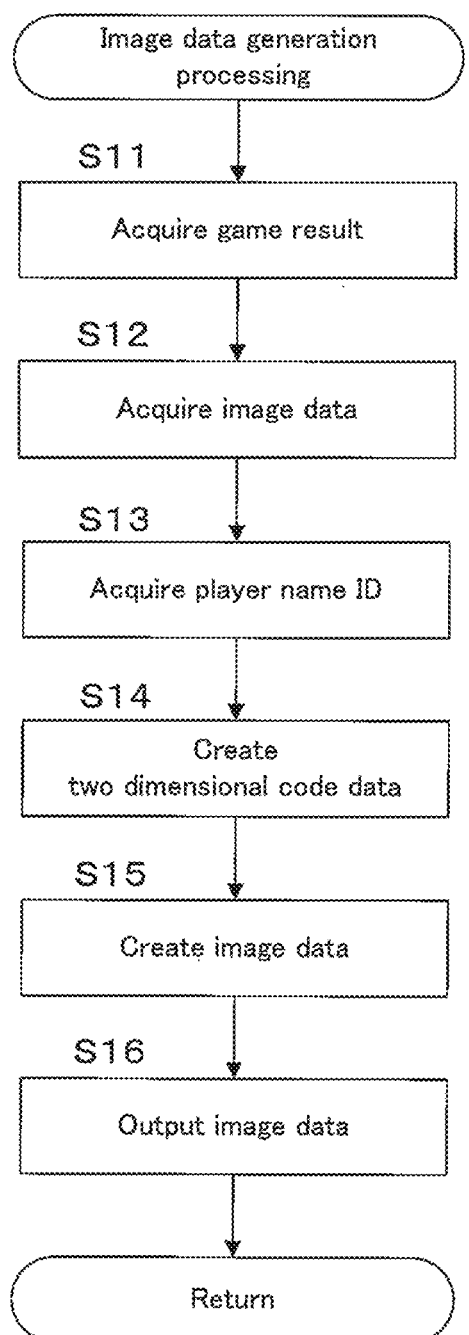
FIG. 8 is a figure showing an example of a flow chart of an image data generation processing routine.

FIG. 8 is a figure showing an example of a flow chart for the image data generation processing routine. The routine of FIG. 8 may, for example, be executed on the basis of a predetermined command by the player, such as a command for character card printing or the like. Incidentally, such predetermined commands also include actuation to select a character to be created as a character card KC, among the characters that are present in the game. Moreover, the routine of FIG. 8 is not limited to being executed on the basis of a predetermined command by the player. For example, the routine of FIG. 8 may also be executed each time the game terminates.

When the image data generation processing routine of FIG. 8 is started, in a first step S11, the control unit 30 acquires the game result. In the game result, information is included for defining a monster that has matured and has changed due to being trained up, in other words information that has changed via the game and that is to be displayed in the monster information region MA and the image region IA and so on.

Next, in a step S12, according to the game result acquired in the step S11, the control unit 30 acquires image data for printing an image of the monster with the printer 32. Moreover, format data for displaying an image FI of the base format portion is also included in this image data. Then in the next step S13, the control unit 30 acquires information about the player name ID. When playing using the character card KC, this information about the player name ID is, for example, acquired from the two dimensional code AC on the character card KC, with reading of the character card KC. Moreover, since a player name ID is assigned at the start of play as the player inputs his/her name when he/she initially plays for the first time without using any character card KC, this player name ID that has been assigned is acquired.

Next, in a step S14, on the basis of the information acquired in the step S11 and the player name ID acquired in the step S13, the control unit 30 creates two dimensional code data for expressing a two dimensional code AC that includes this information. And in the next step S15, the control unit 30 creates image data on the basis of the game result that was acquired in the step S11, the image data that was acquired in the step S12, the player name information that was acquired in the step S13, and the two dimensional code data that was created in the step S14. In concrete terms, the control unit 30 creates image data for expressing a combined image, which has been combined so that the information corresponding to the game result is arranged in the variable regions of the image FI of the base format portion. Moreover, the two dimensional code AC that includes the information corresponding to the game result and the information about the player name ID is also included in this combined image expressed by the image data.

Next, in a step S16, the control unit 30 outputs the image data generated in the step S15 to the printer 32. And, on the basis of this image data that has been outputted, the printer 32 prints the combined image expressed by the image data upon a recording medium in the form of a card. When the processing of the step S16 has been completed, the control unit 30 terminates execution of this routine. Due to this, according to the result of the game, there is created the character card KC upon which the combined image including information of various types for defining the monster that has been trained up is printed, and this character card KC is ejected from the card delivery outlet 12. As a result, on the character card KC, not only the game result, but also the two dimensional code AC that includes information about the player name ID for specifying the owner of the card is printed.

Figure 9:
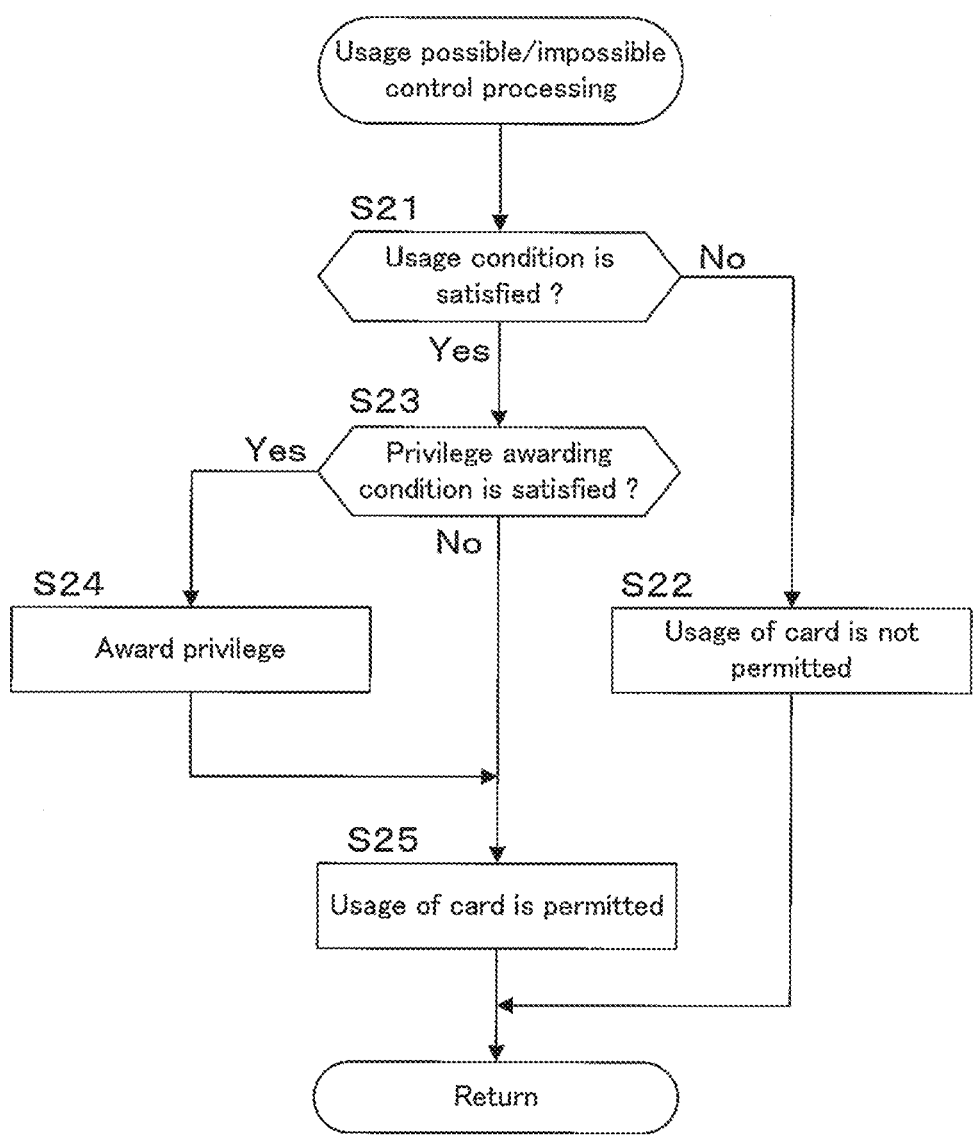
FIG. 9 is a figure showing an example of a flow chart of a usage possible/impossible control processing routine.

On the other hand, FIG. 9 is a figure showing an example of a flow chart for the usage possible/impossible control processing routine. The routine of FIG. 9 may, for example, be executed each time a notification requesting usage of a monster is received from a user terminal 5. This notification requesting usage of a monster may, for example, be transmitted to the center server 2 each time a user terminal 5 performs reading of a two dimensional code AC upon a character card KC. It would also be acceptable to issue a notification requesting usage of a monster when a predetermined actuation indicating that usage of the monster on this character card KC is desired is performed, in addition to the read of the two dimensional code AC on the character card KC. Moreover information of various types that can be acquired from the two dimensional code, such as the player name ID and so on, may be included in this notification requesting usage of a monster.

When the routine of FIG. 9 starts, in a first step S21, on the basis of notification from the user terminal 5, the web service management section 17 determines whether or not a usage condition is satisfied. As this usage condition, for example, there may be employed a condition that is satisfied in the case of a monster corresponding to a player name ID that is registered to the user terminal 5 that is the source of the notification. In other words, as one example, the usage condition may be satisfied in the case of a monster that is owned by a player who belongs to the cooperating group corresponding to the user terminal that is the source of the notification. Accordingly, as one example, this determination may be performed in the following manner. First, along with acquiring the player name ID that is included in the notification from the user terminal 5, the web service management section 17 also specifies the user terminal 5 that is the source of the notification. Next, the web service management section 17 refers to the ID management data 22, and determines whether or not the player name ID that has been acquired is associated with the specified user terminal 5, in other words whether or not the player name ID that has been acquired belongs to the cooperating group corresponding to the user terminal 5 that has been specified. And the web service management section 17 determines that the usage condition is satisfied if the player name ID that has been acquired is associated with the user terminal 5 that has been specified, while it determines that the usage condition is not satisfied if these are not associated. By doing this, in the step S21, the web service management section 17 determines whether or not the usage condition is satisfied, based upon the cooperating groups.

If the result of the determination in the step S21 is negative, in other words if the usage condition is not satisfied, then the web service management section 17 proceeds to a step S22. In this step S22, the web service management section 17 notifies the user terminal 5 that is the source of the notification to the effect that the usage of the monster is not permitted, so that the usage of the monster by this user terminal 5 is not permitted. And the web service management section 17 then ends this processing, and terminates this routine.

On the other hand, if the result of the determination in the step S21 is affirmative, in other words if the usage condition is satisfied, then the web service management section 17 proceeds to a step S23. In the step S23, the web service management section 17 determines whether or not the user terminal 5 that is the source of the notification satisfies the privilege awarding condition. For example, a condition that is satisfied when the number of treasures possessed is at least equal to some predetermined number may be employed as the privilege awarding condition. Moreover, for example, six may be employed as the predetermined number. In other words, as one example, the privilege awarding condition may be satisfied if a total of six or more treasures are possessed. Furthermore, for example, this privilege awarding condition may also be satisfied if the total number of treasures possessed by the three players who are registered to the user terminal 5 is six or more. In other words, whether or not the privilege awarding condition is satisfied is also determined according to units of cooperating groups. Yet further, whether or not treasures are possessed can be determined according to the display in the treasure information region TA of the character card KC. Accordingly, in the step S23, the web service management section 17 determines whether or not the privilege awarding condition is satisfied, on the basis of information in the treasure information region TA that is related to the possession of treasures, among the information of various types included in the notification from the user terminal 5.

If the result of the determination in the step S23 is affirmative, in other words if the privilege awarding condition is satisfied, then the web service management section 17 proceeds to a step S24. In this step S24, the web service management section 17 awards a privilege to the player who is requesting to use the monster. The right to use a rare monster may be employed as one example of a privilege. In other words, the web service management section 17 awards the right to use a rare monster to the player as a privilege. The right to use a rare monster means a right by which the usage of a rare monster is permitted during the game. Accordingly, a player who possesses a right to use a rare monster is able to use that rare monster during the game.

On the other hand, if the result of the determination in the step S23 is negative, in other words if the privilege awarding condition is not satisfied, then the web service management section 17 proceeds to a step S25. In this step S25, the web service management section 17 notifies the user terminal 5 of permission to use the monster, so that the usage of the monster is permitted to the user terminal 5 that was the source of the notification. Moreover, permission for the usage of a rare monster is also included in this notification if the right to use a rare monster was awarded in the step S24. When the processing of the step S25 has been completed, the web service management section 17 terminates this routine. Due to this, whether or not the monster can be used is determined on the basis of the player name ID, and on the basis of the result of this determination, whether or not the monster can be used is controlled. Moreover, whether or not the privilege awarding condition is satisfied is decided according to units of cooperating groups, and the usage of a rare monster is also permitted if the privilege awarding condition is satisfied.

Incidentally, in the case of making a card image CI, the control unit 40 of the user terminal 5 may execute a routine that is similar to that of FIG. 8. Moreover, in the gaming machine GM, in a similar manner to the case with the user terminal 5, if the usage of a monster owned in common by a predetermined number of players is permitted, in other words if it is decided that the privilege awarding condition is satisfied by a cooperating group unit, then the control unit 30 of the gaming machine GM may execute a similar routine to that of FIG. 9.

As has been described above, according to this embodiment, after the game has been played, the character card KC or the card image CI that reflects the result of the game is generated. Moreover, player specification information for specifying the player or players is included in the character card KC or the card image CI. Due to this, it is possible to limit the individuals who use the character cards KC or the card images CI by employing the player specification information. In concrete terms, it is possible to group the players into a plurality of groups by employing the player specification information. Due to this, for example, it is possible to anticipate additional convenience for urging the players within the group to cooperate mutually together, such as an example that they can share items including treasures and so on in the game. And, due to this, it is possible to actualize cooperative play in which a plurality of players mutually cooperate with one another. On the other hand, it is possible to apply different conditions to players who are outside any group, from those conditions applied to players who are within a group. In other words, it is possible to limit the convenience of being able to share items and so on to players within groups. Thus, because of this, it is possible to expand the player base further, since it is possible to motivate the players towards cooperative play.

In the above embodiment, by executing the routine of FIG. 8, the control unit 30 of the gaming machine GM functions as the "information provision device" and the "image data generation device" of the Claims. Moreover, by executing the routine of FIG. 9 via the web service management section 17, the control unit 10 of the center server 2 functions as the "awarding condition determination device", the "privilege awarding device", the "possible/impossible determination device", and the "possible/impossible control device" of the Claims. On the other hand, by storing the ID management data 22 that includes the group ID management data, the storage unit 11 of the center server 2 functions as the "group data storage device" of the Claims. Yet further, by storing the game data 35 that includes the format data, the storage unit 31 of the gaming machine GM functions as the "format storage device" of the Claims.

The present invention should not be considered as being limited to the embodiment described above; it may be implemented in various other ways as appropriate. In the embodiment described above, it is decided whether or not players belong to the same group on the basis of groups that are based upon the player name IDs, and the usage of the character card KC and so on is restricted. In other words, the range over which it is possible to utilize the character card KC and so on is restricted on the basis of groups. However, the present invention is not to be considered as being limited to this embodiment of being restricted on the basis of groups. For example, it would also be acceptable to determine whether or not the character card KC or the like can be utilized, on the basis of the level and the attributes and so on of the monster, in other words on the basis of information that relates to the results of games. In other words, there may be limited the usage of monsters other than those of a certain fixed level or below, or other than those who have specific attributes. Alternatively, it would also be acceptable to limit the usage of a monster on the basis of information characteristic of the player, such as the time the player has been playing or the place in which the player is playing or the like.

In the embodiment described above, the character card KC was used as the recording medium. However, the recording medium is not to be considered as being limited to this embodiment. For example, it would also be acceptable to employ an optical storage medium such as a DVD ROM, a CD ROM, or the like, or a non volatile semiconductor memory such as an EEPROM or the like as the recording medium. Or a user terminal 5, such as a portable telephone or the like, may function as the recording medium. Accordingly, image data for expressing the combined image may be recorded upon the recording medium, even though the combined image is not displayed upon the recording medium.

In the embodiment described above, a card game was used as one example of the arcade game and the mobile game. However, the arcade game and the mobile game are not limited to this type of embodiment. It would also be acceptable to employ a game of many different types, such as an action game, a role playing game, a simulation game, a shooting game or the like, for the arcade game and for the mobile game. Moreover, it would also be acceptable to employ games of different genres for the arcade game and for the mobile game. Accordingly, for example, it would be possible to employ a card game as the arcade game, and a role playing game as the mobile game.

In the embodiment described above, the game application 23 and the game application data 24 were provided from the center server 2 to the user terminals 5 via the network 3. However, the provision of the game application 23 and the game application data 24 is not limited to this embodiment. For example, it would also be acceptable for the game application 23 and the game application data 24 to be supplied from the gaming machine GM to the user terminals 5 via a communication means such as infrared communication or the like. Accordingly, the game system 1 may consist only of the gaming machine GM. Furthermore, the gaming machine GM is not limited to being a gaming machine of the commercial type. For example, it would also be possible to employ a non portable game for home use, or a portable gaming machine or the like as the gaming machine GM, as appropriate.

What is claimed is:

1. A game system comprising:
a gaming machine including: (A) a display device configured to display a game; and (B) a reader configured to receive a physical recording medium having: (i) a predetermined image representative of a character displayed thereon; and (ii) predetermined information including: (a) character data representative of the character; and (b) limiting information comprising a first unique player identification and a second unique player identification;
a remote user terminal configured to provide the game to a first player which is associated with the first unique player identification, a second player which is associated with the second unique player identification, and a third player which is associated with a third unique player identification, the remote user terminal being associated with a unique terminal identification;
an information provision device configured to provide the predetermined information; and
a server apparatus coupled to the gaming machine and the remote user terminal, the server apparatus including: (A) a physical processor; and (B) a memory device storing: (i) group data indicating that the unique terminal identification corresponds to the first unique player identification and the second unique player identification; and (ii) instructions, which when executed by the physical processor, cause the processor to:
(a) acquire the predetermined information from the physical recording medium being received at the gaming machine;
(b) recreate the character using the acquired predetermined information;
(c) utilize, for progression of the game being displayed on the gaming machine, the recreated character during the game based on the acquired predetermined information;
(d) for the first player, in response to a first determination that the first unique player identification of the acquired predetermined information corresponds to the unique terminal identification based on the group data, enable the first player to use the recreated character for progression of the game being displayed on the remote user terminal;
(e) for the second player, in response to a second determination that the second unique player identification of the acquired predetermined information corresponds to the unique terminal identification based on the group data, enable the second player to use the recreated character for progression of the game being displayed on the remote user terminal; and
(f) for the third player, in response to a third determination that the third unique player identification does not correspond to the unique terminal identification based on the group data, do not allow the third player to use the character for progression of the game being displayed on the remote user terminal.

2. The game system of claim 1, further comprising:
an awarding condition determination device adapted and configured to, based on the group data, and based upon groups, determine whether or not a privilege awarding condition is satisfied in units of groups; and
a privilege awarding device adapted and configured to, based on a result of determination by the awarding condition determination device, award an advantageous development to all the players who belong to a group that satisfies the privilege awarding condition.

3. The game system of claim 2, wherein:
the game includes items that are awarded during play; and
as the privilege awarding condition, a condition that is satisfied if a total number of specified items awarded to the players within the group is at least a predetermined number is employed.

4. The game system of claim 1, further comprising:
a possible/impossible determination device adapted and configured to, when the limiting information is acquired from the recording medium, determine whether or not the predetermined information can be used based on the limiting information; and
a possible/impossible control device adapted and configured to control whether or not the predetermined information is used based on a result of determination by the possible/impossible determination device.

5. The game system of claim 1, further comprising:
a format storage device that stores format data for expressing a base format corresponding to a fixed portion of the predetermined image, so that a variable region which is capable of changing information to be displayed in the predetermined image is included in the base format; and wherein:
the information provision device provides the predetermined information so that game information relating to a result of the game is further included therein; and
a combined image in which the base format and the game information are combined so that the game information is displayed in the variable region is used as the predetermined image.

6. The game system of claim 5, further comprising an image data generation device adapted and configured to generate image data for expressing the combined image; and wherein at least one of the image data and the combined image is recorded upon the recording medium.

7. The game system of claim 1, wherein at least one of a two dimensional code created in conformity to a predetermined standard so as to include the predetermined information, and code data for expressing the two dimensional code, is recorded upon the recording medium.

8. The game system of claim 7, further comprising:
a printer that can print the two dimensional code and the predetermined image; and a code reader that can read the two dimensional code printed upon the recording medium; and wherein the printer prints the two dimensional code and the predetermined image upon the recording medium based on the predetermined information and the code data.

9. The game system of claim 1, wherein the server apparatus provides at least one of an application and data for the remote user terminal for providing the game to the remote user terminal via a communication line.

10. A method of operating a game system, the method comprising:

providing a gaming machine including: (A) a display device configured to display a game; and (B) a reader configured to receive a physical recording medium having: (i) a predetermined image representative of a character displayed thereon; and (ii) predetermined information including: (a) character data representative of the character; and (b) limiting information comprising a first unique player identification and a second unique player identification;

providing, via a remote user terminal, the game to a first player which is associated with the first unique player identification, a second player which is associated with the second unique player identification, and a third player which is associated with a third unique player identification, the remote user terminal being associated with a unique terminal identification;

providing, via an information provision device, the predetermined information; and providing a server apparatus coupled to the gaming machine and the remote user terminal, the server apparatus including: (A) a physical processor; and (B) a memory device storing: (i) group data indicating that the unique terminal identification corresponds to the first unique player identification and the second unique player identification; and (ii) instructions, which when executed by the physical processor, cause the physical processor to:

(a) acquire the predetermined information from the physical recording medium being received at the gaming machine;

(b) recreate the character using the acquired predetermined information;

(c) utilize, for progression of the game being displayed on the gaming machine, the recreated character during the game based on the acquired predetermined information;

(d) for the first player, in response to a first determination that the first unique player identification of the acquired predetermined information corresponds to the unique terminal identification based on the group data, enable the first player to use the recreated character for progression of the game being displayed on the remote user terminal;

(e) for the second player, in response to a second determination that the second unique player identification of the acquired predetermined information corresponds to the unique terminal identification based on the group data, enable the second player to use the recreated character for progression of the game being displayed on the remote user terminal; and (f) for the third player, in response to a third determination that the third unique player identification does not correspond to the unique terminal identification based on the group data, do not allow the third player to use the character for progression of the game being displayed on the remote user terminal.

11. A non-transitory computer-readable storage medium storing one or more sequences of instructions which, when executed by one or more processors, causes the one or more physical processors to perform a method of operating a gaming system, the method comprising:

display, via a display device of a gaming machine, a game, the gaming machine including: a reader configured to receive a physical recording medium having: (i) a predetermined image representative of a character displayed thereon; and (ii) predetermined information including: (a) character data representative of the character; and (b) limiting information comprising a first unique player identification and a second unique player identification;

providing, via a remote user terminal, the game to a first player which is associated with the first unique player identification, a second player which is associated with the second unique player identification, and a third player which is associated with a third unique player identification, the remote user terminal being associated with a unique terminal identification;

providing, via an information provision device, the predetermined information;

storing, via a memory device of a server apparatus, group data indicating that the unique terminal identification corresponds to the first unique player identification and the second unique player identification, the server apparatus being coupled to the gaming machine and the remote user terminal; acquiring, via the server apparatus, the predetermined information from the physical recording medium being received at the gaming machine;

recreating, via the server apparatus, the character using the acquired predetermined information;

utilizing, via the server apparatus, for progression of the game being displayed on the gaming machine, the recreated character during the game based on the acquired predetermined information;

for the first player, in response to a first determination that the first unique player identification of the acquired predetermined information corresponds to the unique terminal identification based on the group data, enabling, via the server apparatus, the first player to use the recreated character for progression of the game being displayed on the remote user terminal;

for the second player, in response to a second determination that the second unique player identification of the acquired predetermined information corresponds to the unique terminal identification based on the group data, enabling, via the server apparatus, the second player to use the recreated character for progression of the game being displayed on the remote user terminal; and for the third player, in response to a third determination that the third unique player identification does not correspond to the unique terminal identification based on the group data, not allowing, via the server apparatus, the third player to use the character for progression of the game being displayed on the remote user terminal.

* * * * *